T. S. MOFFETT.
CLEANING KNIFE.
APPLICATION FILED APR. 25, 1908.
912,146.
Patented Feb. 9, 1909.
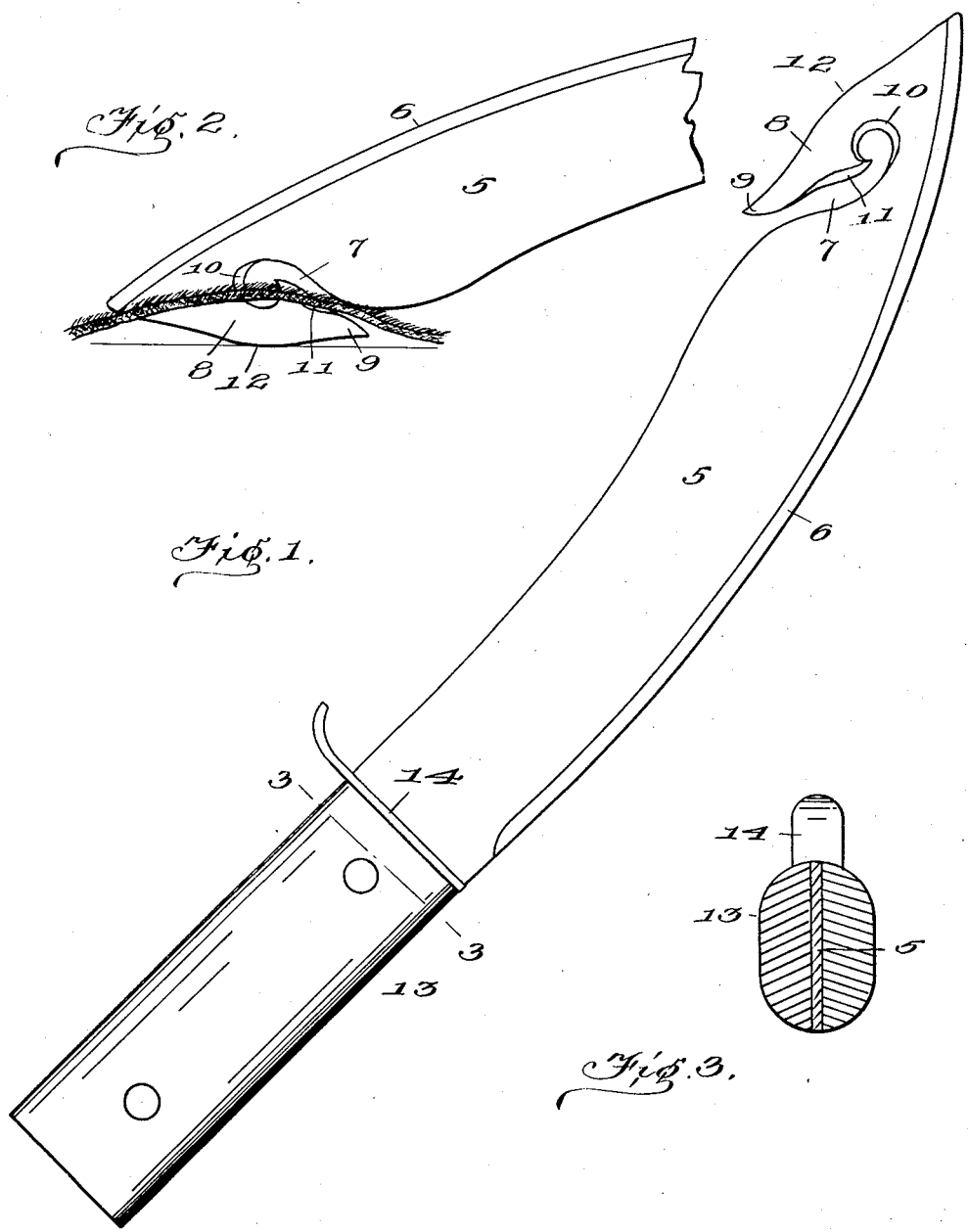

UNITED STATES PATENT OFFICE.

THOMAS S. MOFFETT, OF ALMIRA, WASHINGTON.

CLEANING-KNIFE.

No. 912,146.   Specification of Letters Patent.   Patented Feb. 9, 1909.

Application filed April 25, 1908. Serial No. 429,189.

*To all whom it may concern:*

Be it known that I, THOMAS S. MOFFETT, a citizen of the United States, residing at Almira, in the county of Lincoln and State of Washington, have invented certain new and useful Improvements in Cleaning-Knives, of which the following is a specification.

This invention relates to knives and more particularly one for use in removing the hides of animals.

The object of the invention is to provide a knife of this kind which will facilitate the operation of removing the hide, which is also provided with means for ripping the hide.

To this end the invention consists in a peculiarly constructed blade to be hereinafter described and claimed, reference being had to the accompanying drawing in which:

Figure 1 is an elevation of the knife. Fig. 2 is a fragmentary elevation showing the operation of the ripping device. Fig. 3 is a cross-section on the line 3—3 of Fig. 1.

Referring specifically to the drawing, 5 denotes the blade of the knife having its front edge curved and sharpened to form a cutting edge 6. The blade is pointed at its outer end, and near said end in its rear edge is made an elongated recess or notch 7 to form a hook-shaped cutter 8 having a sharp point 9. The notch terminates in an enlargement or eye the edge of which toward the point of the knife is sharpened to form a cutting edge 10, and the inner edge of the hook is also sharpened along the notch to form a cutting edge 11. The last mentioned cutting edge is also curved so that a draw cut may be had.

The cutting edge 6 will be used for separating the hide from the carcass and the hook-shaped cutter 8 is designed for ripping the hide as shown in Fig. 2. The sharp point 9 of the hook enables the cutter to readily pierce the hide to bring said cutter in operative position as shown in Fig. 2. The outer edge 12 of the hook is blunt so that it may be placed on the platform or floor on which the hide is lying and slid along the same whereby its movement can be more easily guided. The outer edge of the hook is also curved so as to bring the point 9 above the floor or platform when the hide is being ripped as stated.

The blade 5 is provided with a wooden or other handle 13 secured in the usual manner, and a guard 14 is also provided which also serves as a grip when the knife is used for ripping the hide, one or more fingers of the operator being placed on the grip in order that a better hold may be had. The hook-shaped cutter is presented toward the handle of the knife so that the ripping of the hide is done with a pulling action.

The reason for the two cutting edges 11 and 10 is that in an ordinary knife with a wedge shaped notch the hair from the hide and other substances packs into the notch, and makes frequent cleaning necessary. By having the eye with the sharpened edge, and the second sharpened edge along the notch, this objection is avoided, and all loose material and hair will fall away from the knife, the slit in the hide being substantially produced before the hide reaches the cutting edge 10.

I claim:

A skinning knife having an elongated notch in the rear edge thereof, terminating in an enlarged eye toward the point of the knife, and forming a two pointed hook, the edge of the eye on the side toward the point of the knife being sharpened, and the inner edge of the hook, along the notch, being curved inwardly toward the body of the knife and sharpened to form a second cutting edge in advance of the eye.

In testimony whereof I affix my signature, in presence of two witnesses.

THOMAS S. MOFFETT.

Witnesses:
 SAMUEL GARBER,
 N. W. WASHINGTON.